(12) United States Patent
Cao

(10) Patent No.: US 12,516,673 B1
(45) Date of Patent: Jan. 6, 2026

(54) LUMINOUS COMPUTER MONITOR COOLING FAN

(71) Applicant: Shengwei Cao, Changsha (CN)

(72) Inventor: Shengwei Cao, Changsha (CN)

( * ) Notice: Subject to any disclaimer, the term of this patent is extended or adjusted under 35 U.S.C. 154(b) by 0 days.

(21) Appl. No.: 19/298,024

(22) Filed: Aug. 12, 2025

(51) Int. Cl.
| | |
|---|---|
| *F04D 25/08* | (2006.01) |
| *F04D 19/00* | (2006.01) |
| *F04D 29/00* | (2006.01) |
| *F04D 29/52* | (2006.01) |
| *H02J 50/10* | (2016.01) |

(52) U.S. Cl.
CPC ........... *F04D 25/08* (2013.01); *F04D 19/002* (2013.01); *F04D 29/005* (2013.01); *F04D 29/522* (2013.01); *H02J 50/10* (2016.02)

(58) Field of Classification Search
CPC .... F04D 19/002; F04D 25/008; F04D 29/005; F04D 29/522; H02J 50/10
See application file for complete search history.

(56) References Cited

FOREIGN PATENT DOCUMENTS

| CN | 108678980 A | * | 10/2018 | ........... | F04D 29/384 |
| CN | 111120368 A | * | 5/2020 | ............. | F04D 25/08 |
| CN | 112145457 A | * | 12/2020 | ............. | F04D 25/08 |
| CN | 120007603 A | * | 5/2025 | ............. | H02J 50/10 |

OTHER PUBLICATIONS

White paper "Considerations When Designing a Wireless Charing System" by Abracon LLC (hereinafter "ABracon"), 2018; URL: https://www.tti.com/content/dam/ttiinc/manufacturers/abracon/resources/Abracon-White-Paper-Considerations-When-Designing-a-Wireless-Charging-System.pdf (Year: 2018).*
Machine Translation of CN-108678980-A; Retrieved from ESPACENT (Year: 2025).*
Machine Translation of CN-120007603-A; Retrieved from ESPACENT (Year: 2025).*
Machine Translation of CN-112145457-A; Retrieved from ESPACENT (Year: 2025).*
Machine Translation of CN-111120368-A; Retrieved from ESPACENT (Year: 2025).*

* cited by examiner

*Primary Examiner* — Sang K Kim
(74) *Attorney, Agent, or Firm* — All West Law Group PLLC; Aaron Powell

(57) ABSTRACT

A luminous computer monitor cooling fan includes a fan frame and a fan blade assembly connected to the fan frame. A fixing component is arranged in the middle part of the fan frame. A first circuit board and a wireless transmitter coil are arranged on the fixing component. The first circuit board is electrically connected to the wireless transmitter coil. A second circuit board, a wireless receiver coil and a Light-Emitting Diode module are arranged between the fan blade assembly and the fan frame. The second circuit board is electrically connected to the wireless receiver coil and the Light-Emitting Diode module. The wireless transmitter coil and the wireless receiver coil work together to realize wireless power supply for the second circuit board.

8 Claims, 5 Drawing Sheets

LUMINOUS COMPUTER MONITOR COOLING FAN

TECHNICAL FIELD

The invention belongs to the technical field of computer accessories and particularly relates to a luminous computer monitor cooling fan.

TECHNICAL BACKGROUND

The Light-Emitting Diode module of the existing luminous fan is powered by wires and conductive slip rings to form electric brushes, which needs more materials and has more restrictions on wired power supply. The existing luminous cooling fans are powered by wires, which inevitably require electric brush contact points set on the fan shaft, which causes the luminous cooling fans to have the following defects:

First, when the fan blades rotate at high speed in working, it will cause the wired power supply circuit to break, and the electric brush contact points loosened and then fails to use in a longer service life.

Second, since the fan blade assembly requires a high-speed rotation in working, the rotating mechanism and the power supply mechanism will generate a lot of heat when working continuously, leading the entire luminous cooling fan to work under high temperature conditions for a long time, affecting the use effect and service life.

Third, the electric brush is arranged in the center of the fan blade assembly, and there is friction noise when it rotates, which affects the user experience.

Invention Content

In order to overcome the shortcomings of prior art, the present invention provides an electric brushless, silent, wireless transmission, luminous cooling fan, which optimizes the internal structure of the fan. As a result, there is no need to set electric brush and contact points. Therefore, the power supply circuit of the cooling fan is not affected by the electric brush and contact points. When the fan blade assembly rotates, no friction sound or noise is generated, and the fan blade speed is not affected, which can achieve a silent effect, which greatly improve a user experience.

The technical solution adopted by the present invention to solve the technical problem is:

A luminous computer monitor cooling fan includes a fan frame and a fan blade assembly. The fan blade assembly is connected to the fan frame. A fixing component is arranged in the middle part of the fan frame. A first circuit board and a wireless transmitter coil are arranged on the fixing component. The first circuit board is electrically connected to the wireless transmitter coil. A second circuit board, a wireless receiver coil and a plurality of Light-Emitting Diode modules are arranged between the fan blade assembly and the fan frame. The second circuit board is electrically connected to the wireless receiver coil and the plurality of Light-Emitting Diode modules. The wireless transmitter coil cooperates with the wireless receiver coil to perform wireless charging transmission on the second circuit board.

Further, the plurality of Light-Emitting Diode modules is arranged on the back side of the fan blade assembly.

Further, a first mounting groove and a second mounting groove are arranged on the fixing component. The first circuit board is arranged in the first mounting groove. The wireless transmitter coil is arranged in the second mounting groove. The second mounting groove is arranged on the outer periphery of the first mounting groove. A first partition is arranged between the second mounting groove and the first mounting groove, and the first partition is provided with a first notch.

Further, an annular coil mounting groove is arranged on the back side of the fan blade assembly, and the wireless receiver coil is arranged in the coil mounting groove.

Further, a plurality of L shape supporting plates are arranged in the coil mounting groove, and the wireless receiver coil is clamped on the L shape supporting plates.

Further, the wireless receiver coil and the wireless transmitter coil are of the same size, and the wireless receiver coil and the wireless transmitter coil are arranged in a straight line along the axial direction of the fan frame.

Further, a stator is also arranged on the fixing component. A mounting cavity is arranged in the middle part of the fan blade. A magnetic rotor is arranged in the mounting cavity. The magnetic rotor is located on the outer periphery of the stator.

Further, a mounting column extending axially along the fan frame is arranged in the fixing component. A limited column is arranged on the back side of the fan blade assembly. A limited hole is arranged in the middle part of the mounting column. The limited column cooperates with the limited hole to fix the fan blade on the fan frame.

Further, a cover is arranged at the front center side of the fan blade assembly.

The beneficial effects of the present invention are as follows.

First, the plurality of Light-Emitting Diode modules is powered by wireless power source, which optimizes the internal structure of the cooling fan. There are no brush contact points, while the power supply circuit of the fan works without affection. No friction noise when the fan blades rotate at a high speed, users enjoy a silent and luminous using experience.

Second, the wireless receiver coil is the same size in diameter as the wireless transmitter coil. Both the wireless receiver coil and the wireless transmitter coil are arranged in a straight line along the shaft of the fan frame, which can better perform electromagnetic induction, reduce magnetic flux loss, and improve wireless charging transmission efficiency. There is a annular coil mounting groove on the back of the fan blade assembly. Multiple L shape supporting plates in the coil mounting groove are used to clamp the wireless receiver coil, ensuring the stability of the installation of the wireless receiver coil.

Third, the fixing component is provided with a first mounting groove and a second mounting groove, which are used to install the first circuit board and the wireless transmitter coil respectively. The second mounting groove is located at the periphery of the first mounting groove, and the first partition between the two mounting grooves is provided with a first notch to facilitate the connection cable to pass through, so that the internal structure layout is reasonable and compact.

Fourth, compared with the common luminous fans in the market, the luminous cooling fan provided by the present invention can present various light patterns and dynamic light effects, which brings users with visual pleasure.

DESCRIPTION OF MARKS IN FIGURES

1—fan frame; 11—fixing component; 111—first mounting groove; 1111—first circuit board; 112—second mounting groove; 1121—wireless transmitter coil; 113—first partition; 1131—first notch; 12—mounting column; 121—limited hole; 122—stator;
2—fan blade assembly; 21—coil mounting groove; 211—L shape supporting plate; 22—mounting cavity; 221—magnetic rotor; 222—limited column; 223—through hole;
3—second circuit board; 31—wireless receiver coil; 32—Light—Emitting Diode module;
4—cover.

DETAILED DESCRIPTION OF THE EMBODIMENTS

The present embodiment only shows an explanation of the present invention, and it is not a limitation to the present invention. The skilled in the art can make modifications to this embodiment as needed without making any creative contributions after reading this specification, which are always protected by the patent law as long as they are within the scope of the claims of the present invention.

Figure 1:
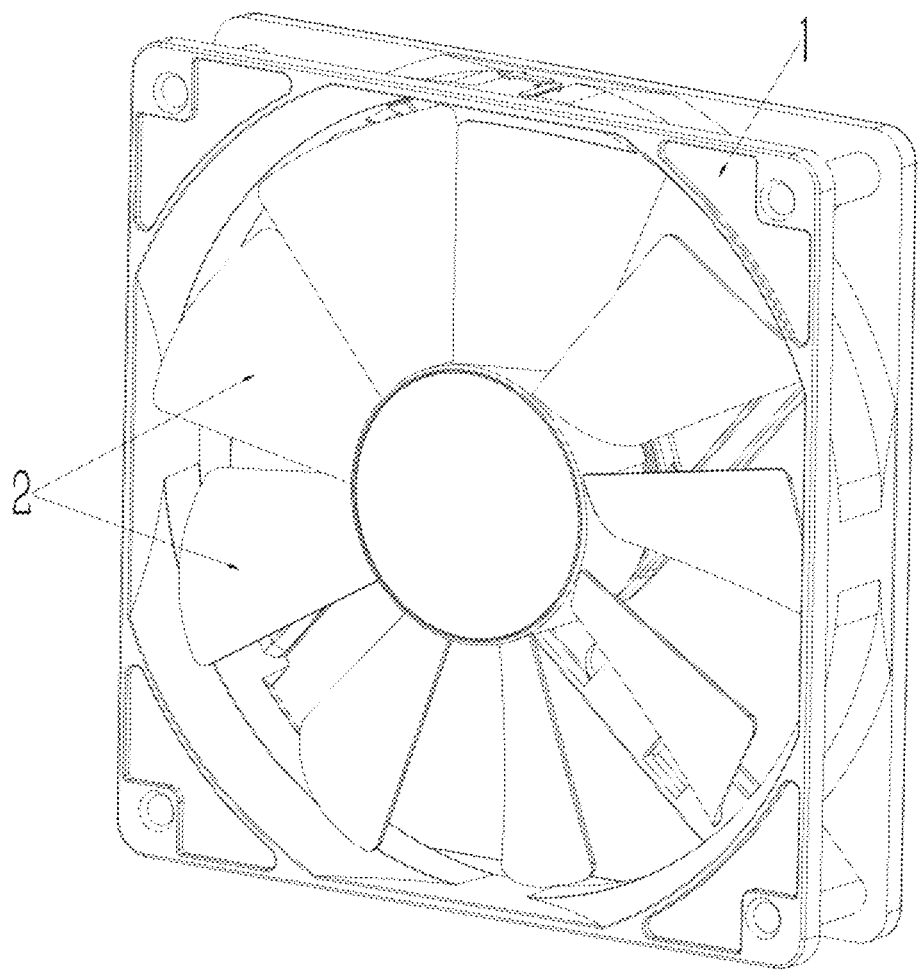
FIG. 1 is a schematic view of a fan in the present invention.
Figure 2:
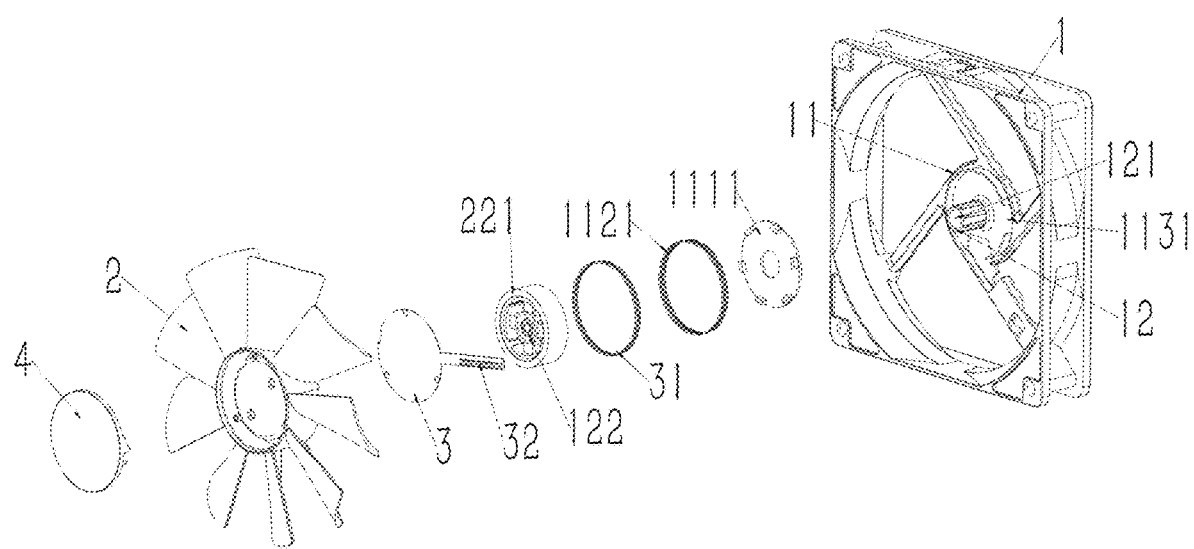
FIG. 2 is an exploded view of the fan of the present invention.
Figure 3:
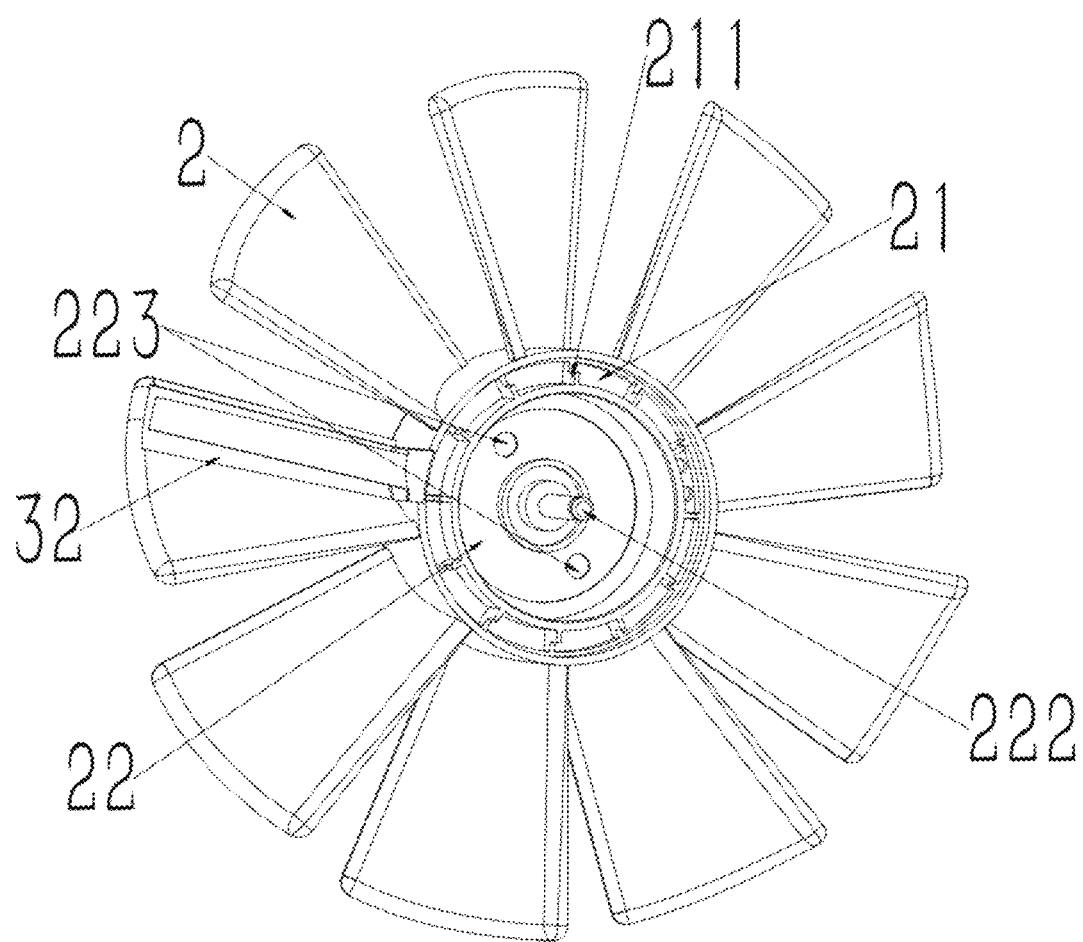
FIG. 3 is a schematic view of a fan blade assembly of the present invention.
Figure 4:
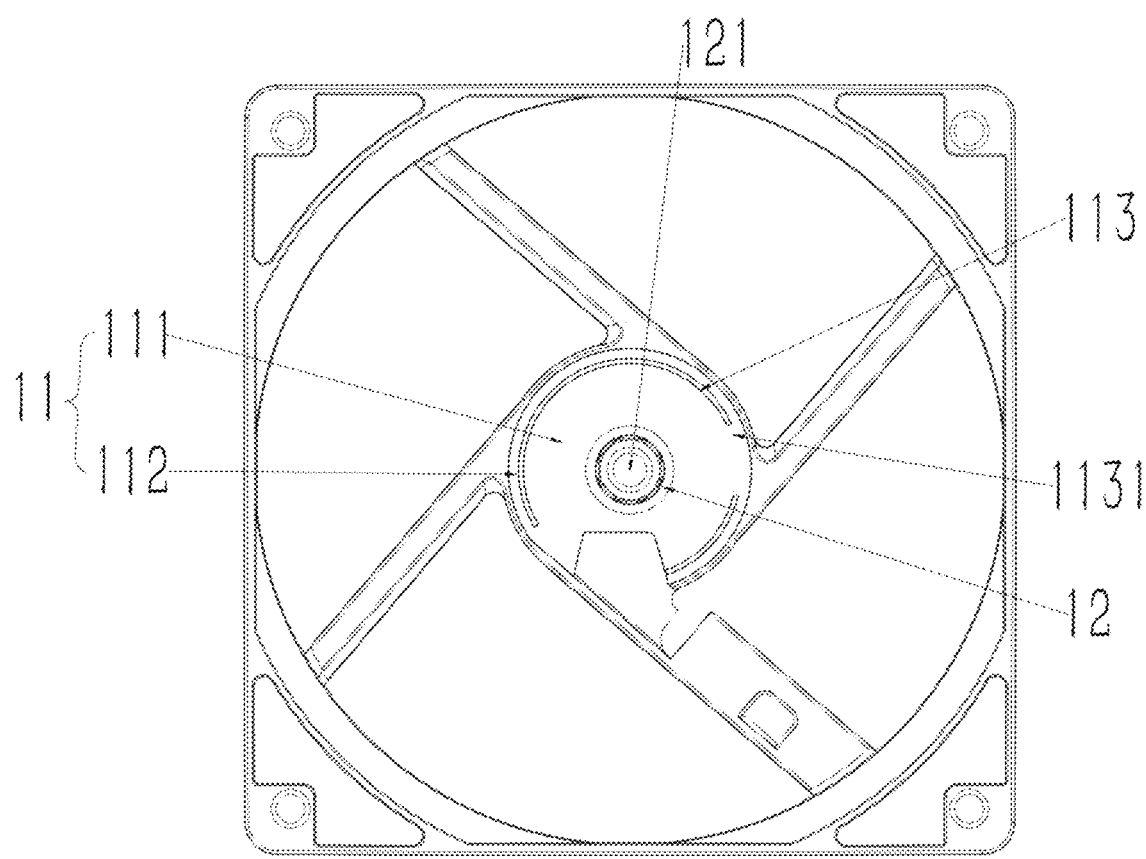
FIG. 4 is a schematic view of a fan frame of the present invention.
Figure 5:
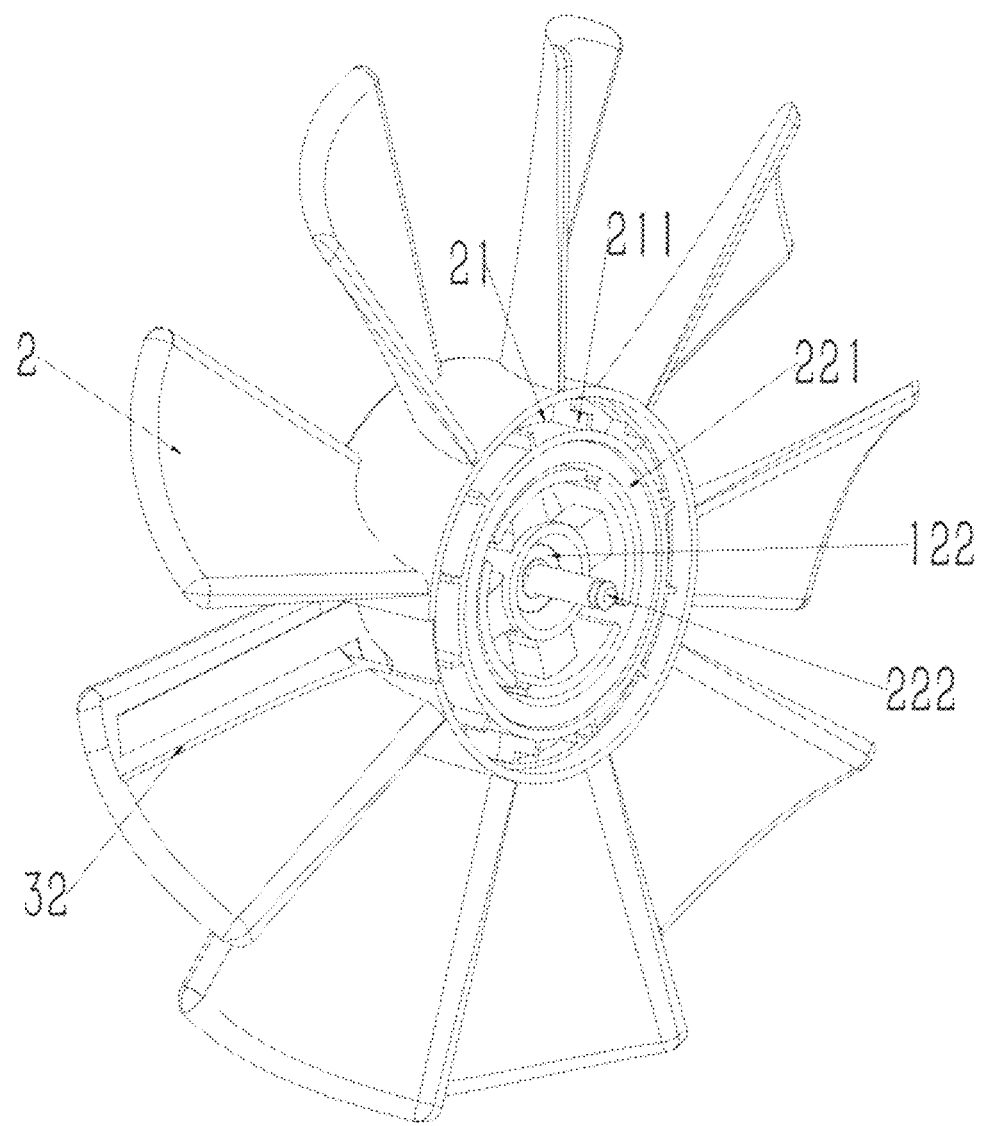
FIG. 5 is a schematic view of a partial structure of the fan in the present invention.

Referring to FIGS. 1 to 5, the present embodiment provides a luminous computer monitor cooling fan, including a fan frame 1 and a fan blade assembly 2. The fan blade assembly 2 is connected to the fan frame 1. A fixing component 11 is arranged in the middle part of the fan frame 1. A first circuit board 1111 and a wireless transmitter coil 1121 are arranged on the fixing component 11. The first circuit board 1111 is electrically connected to the wireless transmitter coil 1121. A second circuit board 3, a wireless receiver coil 31 and a plurality of Light-Emitting Diode modules 32 are arranged between the fan blade assembly 2 and the fan frame 1. The second circuit board 3 is electrically connected to the wireless receiver coil 31 and the plurality of Light-Emitting Diode modules 32. The wireless transmitter coil 1121 and the wireless receiver coil 31 work together to realize wireless power supply for the second circuit board 3.

The plurality of Light-Emitting Diode modules 32 are arranged on the back side of the fan blade assembly 2. When the fan blade assembly 2 rotates, the plurality of Light-Emitting Diode module 32 rotate with the fan blade assembly 2 and produce a dynamic and cool lighting effect. The back side of the fan blade assembly 2 here refers to a side which the fan blade assembly 2 faces the fan frame 1. In this embodiment, only shows one Light-Emitting Diode module 32 is arranged on a blade of the fan blade assembly 2. In actual use, each blade of the fan blade assembly 2 can be provided with one Light-Emitting Diode module 32 controlled by the second circuit board 3 so as to achieve a diversiform dynamic and lighting effect.

Usually, one Light-Emitting Diode module 32 includes 5 to 14 built-in lamp beads. Each Light-Emitting Diode module 32 adopts an Flexible Printed Circuit lamp unit, which has a characteristic of good toughness, strength, and heat dissipation. Such Flexible Printed Circuit lamp unit is suitable for installing with multiple Light-Emitting Diode lamp beads. At the same time, it saves the volume and weight of the fan blade assembly 2 to reduce working load. Such luminous computer monitor cooling fan not only provides users with colorful visual pleasure but also saves electronic energy to be more environmentally friendly.

Different from these conventional luminous fans, the luminous computer monitor cooling fan provided by this embodiment adopts a wireless power supply to the plurality of Light-Emitting Diode modules 32, which can optimize the internal structure of the fan without setting brush contact points. The power supply circuit of the fan works in good condition, and the fan will not produce friction and noise even when the fan blade assembly is in a high rotation speed. In other words, it can achieve a silent effect, thereby improving the user experience.

The fixing component 11 is provided with a first mounting groove 111 and a second mounting groove 112. The first circuit board 1111 is arranged in the first mounting groove 111. A wireless transmitter coil 1121 is arranged in the second mounting groove 112. The second mounting groove 112 is arranged on the outer periphery of the first mounting groove 111. First partition 113 is arranged between the second mounting groove 112 and the first mounting groove 111. The first partition 113 is provided with a first notch 1131, the first notch 1131 allows the electronic cable to go through to electronically connect the wireless transmitter coil 1121 and the first circuit board 1111.

When in use, the first circuit board 1111 on the fixing component 11 is powered by an external power supply. The first circuit board 1111 outputs a high electrical level to the wireless transmitter coil 1121, so that the wireless transmitter coil 1121 generates a magnetic field through electric current. The wireless receiver coil 31 produces electric current in the magnetic field and transmits the electric current to the second circuit board 3, and finally the second circuit board 3 provides a voltage to the plurality of Light-Emitting Diode modules 32 to produce a luminous effect.

An annular coil mounting groove 21 is arranged on the back side of the fan blade assembly 2, and the wireless receiver coil 31 is arranged in the coil mounting groove 21.

Specifically, a plurality of L shape supporting plates 211 are arranged in the coil mounting groove 21, and the wireless receiver coil 31 is clamped on the plurality of L shape supporting plates 211.

The wireless receiver coil 31 and the wireless transmitter coil 1121 are of the same size in diameter and are arranged in a straight line along the axial direction of the fan frame 1, so that the wireless receiver coil 31 and the wireless transmitter coil 1121 can better perform electromagnetic induction and avoid loss of magnetic flux.

A mounting column 12 extending along the axial direction of fan frame 1 is arranged in the fixing component 11. A limited hole 121 is arranged in the middle part of the mounting column 12. A limited column 222 is arranged on the back side of the fan blade assembly 2. The limited column 222 cooperates with the limited hole 121 to fix the fan blade assembly 2 on the fan frame 1.

Stator 122 is sleeved on the limited column 222. A mounting cavity 22 is arranged in the back center of the fan blade assembly 2. A magnetic rotor 221 is arranged in mounting cavity 22. When the fan blade assembly 2 is installed on the fan frame 1, the magnetic rotor 221 is located on the outer periphery of the stator 122, and the magnetic rotor 221 and the stator 122 are both located in the mounting cavity 22.

Two receivers are welded on the second circuit board 3, and two transmitters are welded on the first circuit board 1111. The bottom wall of the mounting cavity 22 is provided with two through holes 223. The two receivers transmit signals to the two transmitters through holes 223, and the two receivers corresponds to the two transmitters one by one.

Corresponding to the two receivers and the two transmitters, the luminous computer monitor cooling fan provided by the present invention application includes a receiving circuit and a transmitting circuit. With the help of the receiving circuit and the transmitting circuit, the luminous computer monitor cooling fan realize wireless power supply function and the wireless signals transmission so as to control the fan blades in working accompanied with a dynamic graphic display. The transmitting circuit is controlled by a Micro Controller Unit (a); and the receiving circuit is controlled by another Micro Controller Unit ($\beta$). In specific, I. Transmitting Circuit The transmitting circuit offers a 12 VDC power input, including two independent branch circuits: Fan Working Control Branch and Wireless Transmission Branch; the Fan Working Control Branch controls the fan blades in working state, while the Wireless Transmission Branch controls the wireless power supply function and the wireless signal transmission.

Fan Working Control Branch: an input of 12V power supply directly controls the brushless motor through a Hall switch. A model of the Hall switch is OCH477H or OCS477H. When there is a 12V electronic power input, then the brushless motor works immediately so as to make the fan in working state.

Wireless Transmission Branch: this branch provides electronic power for the Micro Controller Unit ($\beta$) and sends signals to the Micro Controller Unit ($\beta$) in working process. There are two processes: one is electronic power transmission process, and the other is wireless signals transmission process. As follows:

Electronic power transmission process: The input 12V voltage is processed by a Low Dropout Regulator voltage regulator chip and then provides an electronic power for the Micro controller Unit($\alpha$); then the Micro controller Unit($\alpha$) outputs a 125 KHz Pulse Width Modulation square wave (PWM square wave) to drive the Metal-oxide Semiconductor Field Effect Transistor (MOS-FET) in an on/off condition, so that the wireless transmitting coil 1121 produces an alternating magnetic field at a frequency of 125 KHz to supply the Micro Controller Unit ($\beta$) with an inductive power.

Wireless signals transmission process: a transmitter synchronously transmits two groups of infrared signals or Radio Frequency signals (RF signals). Group A: After a 12V input is powered on, the signal transmitter continuously transmits a factory setting signal to be a original point, which is bound to the rotation of the fan blades assemble.

Group B: The signal transmitter transmits a specified coded signal to control a display effect mode of the Micro Controller Unit ($\beta$).

II. Receiving Circuit

The receiving circuit includes an electronic power supply circuit and a dynamic display mode control circuit. The transmitting circuit provides electronic power and sends out signals to the receiving circuit so as to make the receiving circuit to achieve a dynamic display of graphic symbols. The core logic of the transmitting circuit and the receiving circuit is "power supply, signal synchronization, switching dynamic display". As follows:

Electronic power supply: when the wireless receiving coil 31 inducts the 125 KHz alternating signal from the transmitting circuit, an electronic current is rectified and filtered by a diode, and then the electronic current goes through the Low Dropout Regulator voltage regulator chip to become a low and stable voltage, finally provides electronic supply for the Micro Controller Unit ($\beta$).

Dynamic display mode control: the core logic is displaying signal synchronization and control. The Micro Controller Unit ($\beta$) is provided with multiple groups of built-in graphic symbols, such as 10 groups, corresponding to codes 1-10. A dynamic display mode logic is controlled by the two groups of infrared signals, which are Group A and B. As follows:

The signal of Group A is used to synchronize the origin point of a dynamic display: when the fan rotates a circle, a receiver receives a signal of Group A one time. In other words, the signal of Group A marks the original point of fan rotation. The Micro Controller Unit ($\beta$) calibrates the fan blade position through the signal of Group A to ensure a stable display of graphic symbols and avoid display confusion caused by rotation misalignment.

The signal of Group B is used to manually switch a dynamic display mode: when the receiver receives a signal of Group B, the Micro Controller Unit ($\beta$) immediately switches to the next group of graphic symbols. For example, if the current display mode code is 1, the Micro Controller Unit ($\beta$) will switch to code 2 immediately; if the current display mode code is 2, the Micro Controller Unit ($\beta$) will switch to code 3, and so forth.

An Automatic circulation logic: if a signal of Group B signal is not received for a long time, the Micro Controller Unit ($\beta$) will turn to an automatic circulation mode. In other words, the fan will automatically display the built-in graphic symbols in sequence.

To sum up, the transmitting circuit of the control circuit is responsible for driving the fan to rotate and providing wireless electronic supply and sending signals, while the receiving circuit is responsible for receiving electronic supply and synchronizing signals of Group A and B to switch a dynamic graphic display mode. Finally, the fan rotates and displays dynamic graphics.

The fan provided by the present invention application realizes a coordinated control function of the fan rotation and dynamic graphic display through wireless electronic power transmission and infrared signals interaction. With the help of an infrared signal of Group A to be the origin reference, the fan displays a group of graphic symbols in a stable state without any display confusion caused by rotation dislocation. Besides, with the help of an infrared signal of Group B and an automatic circulation logic, the fan achieves a faster switching of display effects. No doubt, user experience is improved in this way. At the same time, with a reasonable circuit structure designed, each part of the fan is coordinated smoothly to work stably and reliably.

The main function of Stator 122 is to generate a rotating magnetic field. Stator 122 usually consists of an iron core made of stacked silicon steel sheets and a coil winding. When the first circuit board 1111 is powered on, it outputs a high electronic level to Stator 122, a three-phase winding in Stator 122 generates an alternating magnetic field, forming a rotating magnetic field to drive the magnetic rotor 221 to rotate, thereby driving the fan blade assembly 2 to rotate.

Cover 4 is arranged at the front center end of the fan blade assembly 2 and cover 4 is stocked with the product information label.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

The invention claimed is:

1. A luminous computer monitor cooling fan, comprising a fan frame and a fan blade assembly connected to the fan frame; a fixing component is arranged in a middle part of the fan frame; a first circuit board and a wireless transmitter coil are arranged on the fixing component; the first circuit board is electrically connected to the wireless transmitter coil; a second circuit board, a wireless receiver coil and a plurality of Light-Emitting Diode modules are arranged between the fan blade assembly and the fan frame; the second circuit board is electrically connected to the wireless receiver coil and the Light-Emitting Diode module; the wireless transmitter coil and the wireless receiver coil work together to realize wireless power supply for the second circuit board; the fixing component is provided with a first mounting groove and a second mounting groove; the first circuit board is arranged in the first mounting groove; the wireless transmitter coil is arranged in the second mounting groove; the second mounting groove is arranged on an outer periphery of the first mounting groove; a first partition is arranged between the second mounting groove and the first mounting groove; and the first partition is provided with a first notch.

2. The luminous computer monitor cooling fan according to claim 1, wherein the plurality of Light-Emitting Diode modules are arranged on the back side of the fan blade assembly.

3. The luminous computer monitor cooling fan according to claim 1, wherein an annular coil mounting groove is arranged on the back side of the fan blade assembly; the wireless receiver coil is arranged in the annular coil mounting groove.

4. The luminous computer monitor cooling fan according to claim 3, wherein a plurality of L shape supporting plates are arranged in the coil mounting groove to fixedly clamp the wireless receiver coil.

5. The luminous computer monitor cooling fan according to claim 1, wherein the wireless receiver coil and the wireless transmitter coil are of a same side in diameter; the wireless receiver coil and the wireless transmitter coil are arranged in a straight line along an axial direction of the fan frame.

6. The luminous computer monitor cooling fan according to claim 1, wherein a mounting column extending along the axial direction of the fan frame is arranged in the fixing component; a limited column is arranged on the back side of the fan blade assembly; a limited hole is arranged in a middle position of the mounting column; the limited column cooperates with the limited hole to fix the fan blade assembly on the fan frame.

7. The luminous computer monitor cooling fan according to claim 1, wherein a stator is sleeved on the limited column; the fan blade assembly is provided with a mounting cavity; a magnetic rotor is arranged in the mounting cavity, and the magnetic rotor is located on an outer periphery of the stator.

8. The luminous computer monitor cooling fan according to claim 1, wherein a cover is arranged on a front center side of the fan blade assembly.

* * * * *